(No Model.)
J. A. GORGAS.
BICYCLE LOCK AND SUPPORT.
No. 549,311. Patented Nov. 5, 1895.
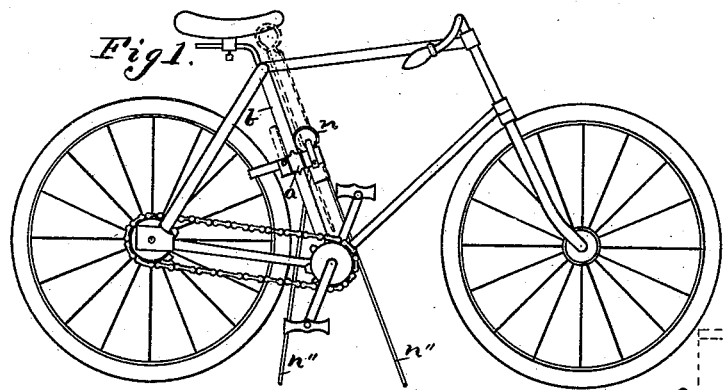
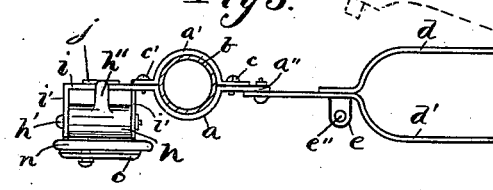
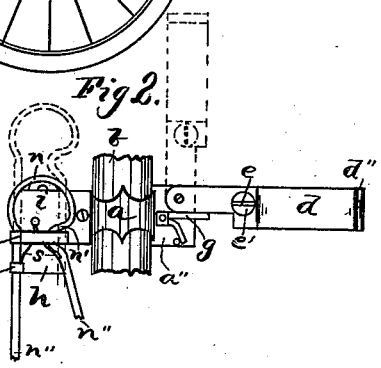
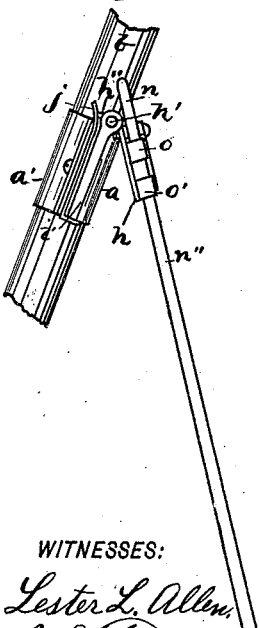
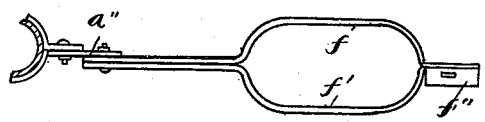
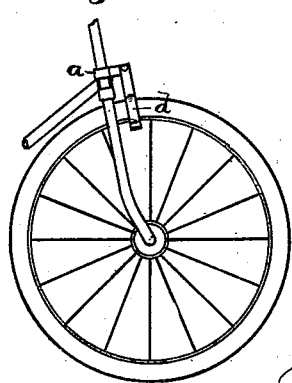
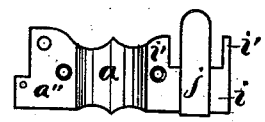
WITNESSES:
Lester L. Allen
A. J. Fiorini
INVENTOR
J. A. Gorgas.
BY
R. J. McCarty
ATTORNEY.

UNITED STATES PATENT OFFICE.

JOHN A. GORGAS, OF NATIONAL MILITARY HOME, OHIO.

BICYCLE LOCK AND SUPPORT.

SPECIFICATION forming part of Letters Patent No. 549,311, dated November 5, 1895.

Application filed March 4, 1895. Serial No. 540,497. (No model.)

*To all whom it may concern:*

Be it known that I, JOHN A. GORGAS, of The National Military Home, county of Montgomery, State of Ohio, have invented a new and useful Improvement in Bicycle Locks and Supports; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in bicycle locks and supports.

The object of said invention is to provide a combined lock and support that may be attached to any of the familiar makes of bicycles, and that may be attached to a bicycle without incumbering the machine with undesirable weight.

To these ends the invention consists of parts, their arrangements and construction, that will be fully described in the following specification and pointed out in the claims.

Referring to the annexed drawings, Figure 1 is a side elevation of a bicycle having my combined lock and support attached thereto; Fig. 2, a side elevation of the lock and support, showing its attachment to the saddle-post, parts of the latter being broken away; Fig. 3, a top plan view of the lock and support, the saddle-post shown in section; Fig. 4, a plan view showing a modified form of locking device; Fig. 5, a front view showing the support in a position to support a bicycle; Fig. 6, a view showing the locking device, minus the support, attached to the front post and locking the front wheel. Fig. 7 is a detail view of the collars showing one-half thereof.

$a$ and $a'$ designate the two parts that constitute a collar adapted to surround the saddle-post $b$ and be made rigid thereto by means of screws $c$ and $c'$. The clamp or lock is constructed of a single piece of spring metal bent to form a hinge $d''$ and having two sides $d$ and $d'$. The latter side is pivoted to the flange $a''$. The clamp thus formed is adapted to inclose the rim of the wheel, as shown in Figs. 1 and 6. The side $d$ is provided with a tongue $e$, that projects through an opening $e'$ in the other of said parts when said parts are closed or brought together, as in Fig. 3. Said tongue is further provided with an opening $e''$, through which the hasp of a padlock may be passed and the parts thereby made secure to each other. Fig. 4 shows this feature of the invention constructed of two spring-pieces $f$ and $f'$, which are secured to the flange $a''$ and one of which has a snap-lock $f''$ rigid on its outer end. When either form of lock is adopted, the clamp may be thrown out of the way when not in use, as shown in dotted lines in Fig. 2.

$g$ designates a spring mounted on the flange $a''$ below the pivoted end of the clamp, which serves to maintain the clamp in a raised position, as indicated in said dotted lines.

The part $a$ of the collar (which is constructed of sheet metal, as is also part $a'$) has an integral extension which terminates in a back $i$ and two ears $i'$. $h$ designates a plate, the upper portion of which incloses a shaft $h'$, that is journaled in said ears $i'$. $h''$ is a rigid tongue projecting from the upper part of said plate $h$ and comes in contact with a plate-spring $j$, secured to the back $i$, as shown in Fig. 7. This spring exerts a pressure upon the plate $h$ to keep said plate in a vertical position, as distinct from the position shown in Fig. 5. The plate $h$ is further provided on its outer face with guides $o$ and $o'$, which are integral parts thereof. The object of this plate $h$ is to afford means for the attachment of a support to maintain the bicycle in an upright position after the rider has dismounted. Said support consists of a steel rod formed, as shown in Fig. 2, with a circular head $n$, having a shoulder $n'$ and legs $n''$, that are adapted to come in contact with the ground, as shown in Fig. 1. When this support is not in use, it may be drawn upward, as shown in dotted lines, the natural resiliency of the metal and a spring $s$ serving to maintain it in such position.

In order that said support may be prevented from slipping downwardly from the plate $h$, the shoulder $n'$ is provided, and should it become desirable to use the locking device without said support this may be easily done by removing said support from the guides $o$ and $o'$. The locking device in such event may be used on the front wheel, as shown in Fig. 6.

Having fully described my invention, I claim as new and desire to secure by Letters Patent—

1. In a bicycle, the combination with the saddle post, of a collar adapted to inclose said saddle post, said collar constructed of two parts one of which has integral extensions or plates ($a''$) and ($i$), a spring clamp constructed of one integral piece pivoted to said plate ($a''$) and adapted to open near the point of its pivotal attachment and to inclose the rim of the rear wheel of a bicycle, a spring ($g$) below said clamp for maintaining said clamp in a raised or vertical position, a spring-pressed plate ($h$) provided with guides ($o$) and ($o'$) mounted in bearings projecting from the plate ($i$), a double leg support slidingly mounted in said guides ($o$) and ($o'$), and a shoulder ($n'$) formed in the upper part of said support whereby means are provided for preventing the shifting of said support when in a lowered position, substantially as described.

2. In a bicycle, the combination with a two part collar adapted to inclose the saddle post, of a spring-pressed plate ($h$) pivoted to one part of said collar, guides ($o$) and ($o'$) on the outer face of said plate, a double leg support slidingly mounted in said guides, and having a head ($n$) to limit the downward movement thereof, and a shoulder ($n'$) to maintain it in a lowered position, substantially as described.

3. In a bicycle, the combination with a collar constructed of two parts one of which has a flange ($a''$), of a spring clamp pivoted to said flange ($a''$) and adapted to inclose the rim of a bicycle wheel, said clamp constructed in one integral piece and having a hinge formed in the outer end, and a supporting spring ($g$) below said clamp to maintain it in a vertical position, substantially as shown and described.

In testimony whereof I have hereunto set my hand this 20th day of February, 1895.

JOHN A. GORGAS.

Witnesses:
J. A. WORTMAN,
R. J. McCARTY.